United States Patent
Bonin

(10) Patent No.: US 9,387,593 B2
(45) Date of Patent: Jul. 12, 2016

(54) PROCEDURE AND CONTROL MEANS FOR CONTROLLING A ROBOT

(71) Applicant: KUKA Laboratories GmbH, Augsburg (DE)

(72) Inventor: Uwe Bonin, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/560,195

(22) Filed: Dec. 4, 2014

(65) Prior Publication Data

US 2015/0151440 A1    Jun. 4, 2015

(30) Foreign Application Priority Data

Dec. 4, 2013   (DE) .......................... 10 2013 020 697

(51) Int. Cl.
| | |
|---|---|
| B25J 13/00 | (2006.01) |
| B25J 19/00 | (2006.01) |
| B25J 9/06 | (2006.01) |
| B25J 9/16 | (2006.01) |

(52) U.S. Cl.
CPC ............... B25J 19/0004 (2013.01); B25J 9/06 (2013.01); B25J 9/1674 (2013.01); *G05B 2219/40218* (2013.01); *Y10S 901/02* (2013.01); *Y10S 901/09* (2013.01)

(58) Field of Classification Search
CPC ........ B25J 19/0004; B25J 9/06; B25J 9/1674; Y10S 901/02; Y10S 901/09
USPC ........... 700/245, 253, 256; 901/2, 9; 318/3–5, 318/568.21, 574
See application file for complete search history.

(56) References Cited

U.S. PATENT DOCUMENTS

| | | | | |
|---|---|---|---|---|
| 4,693,665 | A | * 9/1987 | Friederichs | ............... B25J 9/046 188/72.4 |
| 4,928,047 | A | * 5/1990 | Arai | .......................... B25J 9/042 188/366 |
| 5,144,213 | A | * 9/1992 | Sasaki | ................ G05B 19/4147 318/569 |
| 5,667,186 | A | * 9/1997 | Luber | ..................... A61B 19/26 248/123.11 |
| 6,563,281 | B1 | 5/2003 | Ramstrom et al. | |
| 2003/0141155 | A1 | * 7/2003 | Daneryd | .............. B25J 19/0004 188/267.1 |

(Continued)

FOREIGN PATENT DOCUMENTS

| | | |
|---|---|---|
| CN | 1111448 A | 11/1995 |
| CN | 101116968 A | 2/2008 |

(Continued)

OTHER PUBLICATIONS

German Patent Office; Search Report in German Patent Application No. 10 20131 020 697.9 dated Oct. 8, 2014; 10 pages.

(Continued)

*Primary Examiner* — Dalena Tran
(74) *Attorney, Agent, or Firm* — Wood, Herron & Evans, LLP

(57) ABSTRACT

A method for controlling a robot that has a plurality of articulation axes, with at least one axis that includes a drive mechanism for moving the axis and a holding brake for limiting movement of the axis. The method includes closing the holding brake and at least one of opening the holding brake after the closing step based on an axial load, or opening the holding brake for a specified duration. In addition, or alternatively, closing of the holding brake may be delayed for a period of time. The holding brake may be closed in response to the detection of a monitoring-related condition of the robot.

27 Claims, 1 Drawing Sheet

(56) References Cited

U.S. PATENT DOCUMENTS

| | | |
|---|---|---|
| 2003/0192758 A1 | 10/2003 | Murata |
| 2003/0233171 A1 | 12/2003 | Heiligensetzer |
| 2008/0116828 A1* | 5/2008 | Horikoshi ............... H02P 3/04 318/273 |
| 2011/0126660 A1 | 6/2011 | Lauzier et al. |

FOREIGN PATENT DOCUMENTS

| | | |
|---|---|---|
| DE | 254163 A1 | 2/1988 |
| DE | 10226853 B3 | 2/2004 |
| DE | 60010649 T2 | 5/2005 |
| DE | 10394302 T5 | 5/2007 |
| DE | 102010052418 A1 | 6/2011 |
| DE | 102010063208 A1 | 6/2012 |
| DE | 102012012988 A1 | 4/2014 |
| EP | 1304604 | 5/1919 |
| EP | 1 905552 A1 | 4/2008 |
| JP | 2003131701 A | 5/2003 |
| KR | 20040014393 A | 2/2004 |

OTHER PUBLICATIONS

Chinese Patent Office; Office Action in Chinese Patent Application No. 201410734549.3 dated Nov. 2, 2015; 12 pages.

Korean Patent Office; Office Action in Korean Patent Application No. 2014-0172239 dated May 9, 2016; 10 pages.

* cited by examiner

PROCEDURE AND CONTROL MEANS FOR CONTROLLING A ROBOT

TECHNICAL FIELD

The present invention relates to a procedure and control means for controlling a robot, a robot arrangement having a robot and said type of control means as well as a computer program product for conducting said type of procedure.

BACKGROUND

Based on in-house practice, robots comprise holding brakes. In normal operation, they can be closed, for example to save energy while the robot is idle or to secure its holding pose.

In particular in connection with an unplanned presence of an obstacle within the operating range of a robot, the robot can collide with the obstacle, thus squeezing it. Based on in-house practice, it has therefore been established to monitor the robot for collisions and to shut it down safely by means of the holding brakes in the event of a detected collision. Should the robot have squeezed the obstacle, said squeeze will be maintained by the holding brakes.

In particular for this reason, it has been established based on in-house practice, to provide mechanical free rotating devices or to control the robot with compliance, in particular compensating for gravitational attraction, such that it can be actively moved or at least steer clear as a result of the squeeze (reaction) force and hence release or at least reduce the squeeze.

SUMMARY

One of the objects of the present invention is to improve the operation of a robot. This object is solved with the methods disclosed herein, or by a control means or computer program product for the conduct of the corresponding method, or by a robot arrangement having corresponding control means.

A robot arrangement according to the present invention comprises a robot and control means for controlling the robot.

The robot comprises an axis arrangement, having one or a plurality, in particular at least six (mobile) axes, each having a driving mechanism and a holding brake.

In one embodiment, one or a plurality, in particular all of the axes can be rotational axes, in particular arranged in pairs perpendicular to each other, or the robot can be a so-called articulated arm robot. Similarly, one or a plurality of the axes can be linear axes.

In one embodiment, an axial drive can comprise one or a plurality of motors, in particular electric motors and/or transmissions.

In one embodiment, a holding brake is provided or set up for shutting down or fixing the axis; in one embodiment as emergency and/or handbrake. In particular, it can comprise, in particular be, a mechanical or hydraulic friction brake. In one embodiment, the holding brake is normally closed or closed in unactuated state or actively released, said brake closing automatically, in particular when cut off from an energy supply.

The control means are provided for controlling the robot or set up as an inherent component of the hardware and/or software or the program. To achieve a more compact illustration, a regulation or output of actuating variables on the basis of specified target and determined actual variables is likewise referred to as control in a generalized fashion in the present invention.

A means within the meaning of the present invention can be designed as an inherent component of the hardware and/or software or the program, in particular a digital, processing, in particular microprocessor unit (CPU), in particular preferably connected by way of data or signals with a storage and/or bus system, and/or comprise one or a plurality of programs or program modules. The CPU can be designed for the purpose of processing commands that are implemented as a program stored in a storage system, recording input signals from a data bus and/or delivering output signals to a data bus. A storage system can comprise one or a plurality, in particular different storage media, in particular optical, magnetic, solid state and/or other non-volatile media. The program can be designed such that it embodies or is able to execute the procedures described herein, such that the CPU is capable of executing the steps of said procedures and hence in particular is capable of controlling the robot.

In one embodiment, in particular a monitoring means of the control means set up for this purpose with inherent hardware, in particular sensor and/or software or program components, is used to monitor an operation of the robot, in particular the robot and/or its environment, in particular for a collision with an obstacle.

For this purpose, one or a plurality of force sensors, in particular torque sensors of the monitoring means on the robot can record or be set up for the purpose of determining contact forces acting on the robot and/or axial loads of its axis arrangement in one embodiment. In addition or alternatively, one or a plurality of protective sensors of the monitoring means, in particular protective door contacts, emergency off input means or similar, can monitor a protective device of the robot arrangement or be set up for this purpose. In addition or alternatively, one or a plurality, in particular optical, thermal, acoustic, electrical and/or magnetic sensors for monitoring the surrounding area of the monitoring means can monitor or be set up for the purpose of monitoring a surrounding area of the robot, in particular for the presence of unintended obstacles.

Generally, monitoring can comprise in particular a force-based, in particular torque-based, preferably axial load-based collision monitoring, in particular be in particular force-based, in particular torque-based, preferably axial load-based collision monitoring.

In the event that the monitoring or the monitoring means determines an error, in particular a collision, one or a plurality of axes of the robot, in one embodiment selectively one or a plurality of selected axes of the axes of the robot, in another embodiment all axes of the robot, are shut down or fixed by means of the corresponding holding brakes, in particular in that the monitoring means issues the command to close the holding brake(s). In particular a shut-down or fixation of one axis of the robot by its holding brake as a result of the determination of an error, in particular a collision of the robot by monitoring or the monitoring means, is referred to as monitoring-related closure of said holding brake within the meaning of the present invention.

In addition or alternatively to a monitoring-related closure, a specification-related closure can take place or be specified in one embodiment, in particular a closure on the basis of a specified closing command in a robot program, which is being processed or executed, and/or on the basis of an, in particular manual, user input during the operation. If a closure is being or has been specified, in particular by means of a robot program or a user input during the operation, one or a plurality of axes of the robot, in one embodiment selectively one or a plurality of selected axes of the axes of the robot, in another embodiment all axes of the robot, are shut down or fixed by means of the corresponding holding brakes, in particular in that a means for closing the holding brakes of the control means set up for this purpose with inherent hardware components, in particular sensor components and/or software or program components, issues the command to close the holding brake(s) In particular a shut-down or fixation of one axis of the robot by its holding brake as a result of a program-related and/or manual specification or input by the control means is referred to as specification-related closure of said holding brake within the meaning of the present invention. To achieve a more compact illustration, a monitoring means set up for commanding a closure of the holding brake(s) as a result of a determined error is likewise referred to as holding brake closing means in a generalized fashion in the present invention. In addition or alternatively, a holding brake closing means can be set up for the purpose of commanding a specification-related closure on the basis of a specified closing command in a robot program and/or a user input.

Before a monitoring- and/or specification-related closure, mobile axes can be slowed down by the corresponding contra-rotating drives or drives actuated by braking and/or the holding brakes, preferably until they come at least essentially to a standstill. Analogously, in one embodiment, holding brakes can slow down mobile axes or also only be engaged or closed when the axes are at least essentially shut down, in particular by a hardware-, in particular sensor-related and/or software- or program-related holding brake closing means, in particular monitoring means, set up for this purpose.

According to one aspect of the present invention, one or a plurality, in particular selectively one or a plurality of selected or all holding brakes of the robot are opened again, in particular by a hardware- and/or software- or program-related holding brake opening means of the control means set up for this purpose, after they had been closed before, in particular related to the monitoring or the specifications. Similarly, one or a plurality, in particular selectively one or a plurality of selected or all holding brakes of the robot can remain open before, in particular the monitoring- or specification-related closure in a fashion that will be explained in greater detail below, or their, in particular monitoring- or specification-related closure can be delayed or moved.

By opening holding brakes again after an, in particular monitoring- or specification-related closure or by delaying their, in particular monitoring- or specification-related closure, a squeeze of a robot, in particular the squeeze of the obstacle between the robot and a surrounding area can advantageously be released or in any case reduced in one embodiment, in that the corresponding axis (axes) of the robot is/are moved by the squeeze (reaction) force and/or actively by a corresponding release force, thus reducing, preferably relieving the squeeze (reaction) force. For example, a person squeezed by the robot can "push away" the robot to free him/herself or at least to reduce its load, while the holding brake(s) is/are again or still open before they are closed (again), in particular related to the monitoring or the specifications.

According to one aspect of the present invention, one or a plurality, in particular monitoring- or specification-related, closed holding brakes of the robot are opened again for a specified duration or remain open for a specified duration before the, in particular monitoring- or specification-related, closure.

This way, a squeeze can be reduced, in particular released in a simple and/or secure fashion in one embodiment.

In one embodiment, the defined duration for at least one holding brake amounts to at most 2 seconds, in particular at most 1.5 seconds, preferably at most 1.2 seconds. In one embodiment, this helps reduce in particular a gravitational force-related slumping of the robot. In addition or alternatively, the duration for said holding brake can amount to at least 0.05 seconds, in particular at least 0.1 seconds and preferably at least 0.15 seconds. In one embodiment, this achieves an adequate reduction of a squeeze.

A duration within the meaning of the present invention can in particular be a duration of time, but also a number of (control) cycles or similar.

In one embodiment, the duration can get to be or be specified depending on the axes. In particular, the robot can comprise at least two axes with holding brakes, wherein the specified duration for one axis, in particular always or depending on the situation, can be longer than the specified duration for the other axis. In particular, a specified minimum and/or a maximum duration can be longer for one axis than a specified minimum and/or maximum duration for the other axis. In one embodiment, this achieves an axis-specific and hence better reaction, in particular in the fashion explained in greater detail below.

Axes of robots may or may not—potentially or actually—be gravitational force-loaded. The term gravitational force-loaded axis as used herein means in particular an axis that attempts to move or—in particular when overcoming possible friction—moves or starts moving when the holding brake is opened as a result of the gravitational force, in particular the weight of a (partial) structure or kinematics of the robot, which are coupled with or movable by said axis. For example, a vertical rotational axis of a single-link robot having only said rotational axis is an axis not subject to gravitational force, as said axis does not move in relation to the gravitational force or its own weight, independently of the robot's pose, even if the holding brake is opened. In contrast, the horizontal rotational axis $q_2$ of the robotic arm 1.2 of a two-link robot as illustrated in FIG. 1, is an axis that is always at least potentially subject to gravitational force, as said axis moves or is set in motion in relation to the gravitational force or as a result of the robotic arm's own weight or when it overcomes possible friction, except in a vertically suspended, stable and a vertically upward stretched, instable pose with opened holding brake. Analogously, in a non-vertical pose, in particular in the horizontally stretched pose, illustrated in FIG. 1, said axis is an actually gravitational force-loaded axis, whereas in a suspended and a vertically upward stretched pose, it is only a potentially gravitational force-loaded axis.

In connection with the renewed opening according to the invention of a holding brake that was previously closed, in particular related to the monitoring or specifications or a delay of an, in particular monitoring- or specification-related closure for a specified duration, a distinction can be made in particular between potentially or actually gravitational force-loaded and not gravitational force-loaded axes. In one example, a longer duration can be specified for an axis that is in particular not potentially or actually gravitational force-loaded than for one, in particular potentially or actually gravitational force-loaded axis, as the not gravitational force-loaded axis does not result in a slumping of the robot, even in connection with a prolonged (renewed) opening.

In particular for a potentially or actually gravitational force-loaded axis, the duration can be defined depending on a pose of the robot and/or in such a way that a gravitational force-related motion of the axis is limited for the course of the duration, preferably to an angle area of at most 30 degrees, in particular at most 15 degrees, preferably at most 5 degrees.

The term pose as used herein in particular means in customary fashion the orientation and position, in particular the angular position of one or a plurality, in particular of all axes of the robot.

Depending on the pose, an axis can be subject to different degrees of gravitational force. For instance, in the pose illustrated in FIG. 1, the action is exerted by the weight of the stretched out robotic arm with maximum lever arm. Analogously, the holding brake can again be opened here for a shorter duration or remain open prior to the, in particular monitoring- or specification-related closure. In contrast, for a pose rotated by 45 degrees in relation to the above, only half of the lever arm is still active, such that the holding brake can be opened here again for a longer duration or remain open prior to the, in particular monitoring- or specification-related closure, without causing the robot to slump excessively.

For an axis that is not, in particular potentially or actually gravitational force-loaded, the duration can be specified in advance and preferably not changed during the operation in one embodiment.

According to a further aspect of the present invention, one or a plurality, in particular monitoring- or specification-related, closed holding brakes of the robot are opened again depending on an axial load or remain open prior to the, in particular monitoring- or specification-related closure, depending on an axial load.

An axial load can in particular comprise, in particular be a force that acts directly on the axis. For a more compact illustration, an anti-parallel couple of forces, i.e. a torque, is likewise referred to in a generalized fashion as force within the meaning of the present invention. In other words, an axial load can in particular also comprise, in particular be an axial or hinge moment, which is determined by a corresponding force sensor, in particular a (hinge) moment sensor in one embodiment. Similarly, an axial load can comprise, in particular be a force acting from the outside onto a link of the robot and hence only indirectly onto the axis(es) in one embodiment. In one embodiment, such an (indirect) axial load can be determined by a corresponding force sensor, in particular a sensor for a moment of force, which can be arranged between a flange tool and a robot-guided tool in an upgrade. In this fashion, in particular a squeeze by a robot-guided tool can be determined and reduced. Preferably, an axial load acting in front of or on the holding brake is determined as axial load, for example a torsional moment in a shaft braked by a holding brake, a bearing load of the holding brake, or similar.

According to said aspect, a squeeze can be reduced, in particular released in accordance with the situation and hence in a better fashion in one embodiment.

In one embodiment, the holding brake can in particular be opened again or remain open prior to the closure, if, in particular in the event of or for as long as the axial load or a deviation of the axial load from a specified load exceeds a limit value and/or the axial load is acting in a certain load direction.

The limit value and/or the specified load can, in particular for a not potentially or actually gravitational force-loaded axis, be defined as fixed or variable, in particular set in advance. In particular for a potentially or actually gravitational force-loaded axis, the limit value and/or the specified load can be specified depending on the pose, in particular based on the model in one embodiment.

In one embodiment, the load specification can comprise, in particular be a gravitational force-related axial load or an axial load resulting from the weight of the (partial) structure or kinematics of the robot coupled by the axis, and/or be determined depending on the pose, in particular by means of a mechanical replacement model of the robot or an advance measurement, preferably accounting for friction.

If the robot is squeezing an obstacle, the actual determined axial load deviates from said gravitational force-related axial load or load specification as a result of said squeeze. Looking again at the example of FIG. 1, the force of a spring 2 squeezed by the robot reacts to and reduces the weight of the robotic arm 1.2. Analogously, in one embodiment, the holding brake of the axis $q_2$ can be opened again or remain open before the, in particular monitoring-related closure, if, in particular in the event of or for as long as the deviation of the axial load in the form of a hinge moment $M_2$ or a force $F_2$ at the flange tool of a gravitational load-related load specification exceeds a limit value.

In addition or alternatively to said type of, in particular model-based limit value for an axial load or for its deviation from an, in particular model-based load specification, the holding brake can again be opened or remain open prior to the, in particular monitoring- or specification-related closure, if, in particular in the event of or for as long as the axial load is acting in a specific load direction. In the example of FIG. 1, the weight of the robotic arm 1.2 is attempting to twist it in clockwise direction. The force of the spring 2 squeezed by the robot counteracts the above. If the resulting torque exceeds the torque of the axis $q_2$ resulting from the weight of the arm, the robot or its arm 1.2 does not slump downward, even if the holding brake of the axis $q_2$ is open, but it is instead supported by the spring 2 and even twisted in counterclockwise direction, such that the squeeze is reduced. Accordingly, the specific load direction can in general be the moving direction, in particular the direction of rotation of the axis that is opposed to a gravitational force-related moving direction, in particular torque direction resulting from the weight of the (partial) structure or kinematics of the robot coupled by the axis.

The example of FIG. 1 also illustrates that the limit values or load specifications for the axes $q_1$, $q_2$ preferably can be defined differently or depending on the axes: while the gravitational load-related axial load or load specification and the corresponding load direction for the axis $q_2$ is pose-dependent, it can be specified as constant for the axis $q_1$ in advance.

The two aspects explained above relating to the renewed opening after an, in particular monitoring- or specification-related closure or the remaining open prior to an, in particular monitoring- or specification-related closure of at least one holding brake for a specified duration on the one hand and depending on an axial load on the other hand, represent different realizations of the same concept. Analogously, they are or can be realized independently of each other. However, both aspects are combined with each other in a preferred embodiment, in particular in at least one of the fashions explained below.

In one embodiment, (only) the holding brakes that are subject to a corresponding axial load, in particular due to a squeeze or involved in a squeeze are opened again for a specified duration or remain open prior to the, in particular monitoring- or specification-related closure for a specified duration. This can be defined in particular depending on an axial load of the respective axis. As outlined above, an axial load determined in connection with a squeeze deviates from a determined gravitational load-related, in particular model-based load specification; it can react in particular to a gravitational load-related axial load. Analogously, the holding brake can be opened again for a specified duration or remain open prior to the closure in one embodiment, if the axial load or a deviation of the axial load from an, in particular pose-dependent, gravitational force-related load specification exceeds an, in particular pose-dependent, gravitational force-related limit value and/or the axial load is acting in a pose-dependent, gravitational force-related load direction.

In this fashion, the aspect of dependency on an axial load is advantageously combined with the aspect of the specified duration.

In one embodiment, the holding brake, which is opened again depending on an axial load or remains open prior to an, in particular monitoring- or specification-related closure is or remains open for a specified duration, in particular also in the case where the axial load alone would not (no longer) result in a renewed opening or continuation of the opening. In this fashion, in particular a temporal hysteresis can become or be implemented, which reacts to an unwanted, premature closure of the holding brake: if the holding brake is or remains open depending on an axial load, the determined axial load rapidly decreases due to the loss of the resistance or reaction of the holding brake. The temporal hysteresis here helps ensure a minimum opening time.

In this fashion, the aspect of the specified duration is advantageously combined with the aspect of the dependency on an axial load.

In one embodiment, the specified duration is specified depending on an axial load of the robot. In this fashion, the aspect of the dependency of an axial load is advantageously combined with the aspect of the specified duration.

The specified duration can in particular be extended if, after a first specified duration, the axial load or a deviation of the axial load from an, in particular pose-dependent, gravitational force-related specified load, in particular continues to exceed an, in particular specified, in particular adjustable, and/or axis-dependent and/or pose-dependent, in particular gravitational force-related limit value and/or the axial load is acting in an, in particular pose-dependent and/or gravitational force-related load direction. Consequently, as explained above, the holding brake can initially be or remain open for at least the first specified duration in one embodiment. If it is determined that the axial load or its deviation exceeds a limit value and/or the axial load is acting in a specific load direction after said duration has elapsed, because for example a squeeze continues to exist, said duration can be extended, in particular once or also several times or successively, in particular for as long until the axial load or its deviation no longer exceeds the limit value or the axial load is no longer acting in the specific load direction after the extended duration has elapsed.

With the aspect explained above, the holding brake can in each case again be opened or remain open prior to the closure, while the driving mechanism of the axis is inactive, in particular related to the monitoring or specifications, in particular disconnected from an energy supply and/or the robot is at least essentially shut down. In particular, the holding brake can hence be opened again or remain open prior to the closure in connection with a so-called STOP 0 or STOP 1. In this fashion, a squeeze of an obstacle by the robot can be reduced in a very safe fashion, preferably released in a simple and/or situation-appropriate manner, even if the drive mechanisms are inactive, in particular disconnected from an energy supply.

BRIEF DESCRIPTION OF THE FIGURES

Additional advantages and characteristics can be gathered from the dependent claims and the exemplary embodiments. The figures show partly schematized representations:

DETAILED DESCRIPTION

Figure 1A:
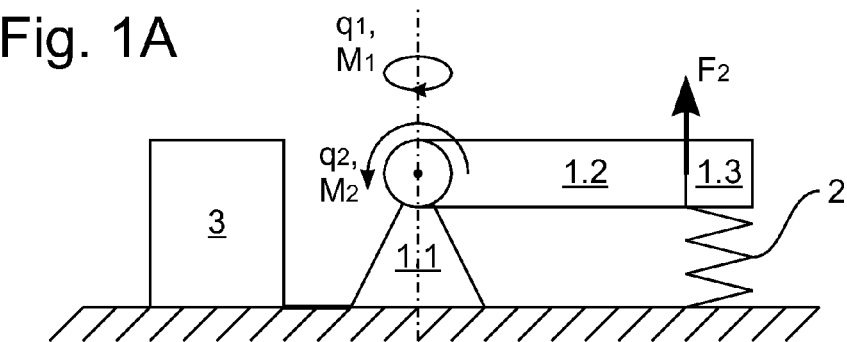
FIG. 1 shows a robot arrangement comprising a simple two-link robot and a control means according to one embodiment of the present invention in a side view (FIG. 1A) and a top view (FIG. 1B)
Figure 1B:
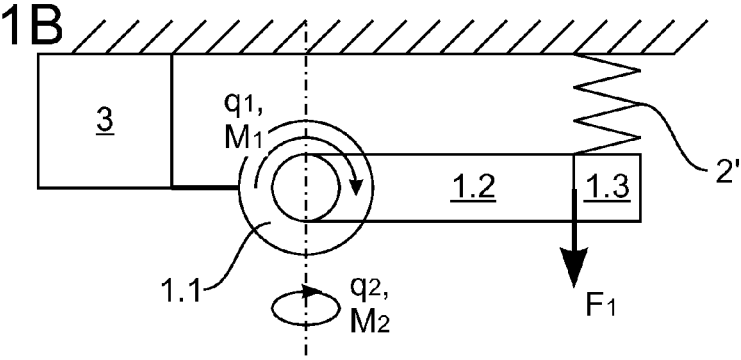

FIG. 1 shows a robot arrangement comprising a robot with only two links for illustration purposes and a control means 3 according to one embodiment of the present invention in a side view (FIG. 1A) and a top view (FIG. 1B).

The robot comprises a robot base 1.1, which can be rotated around a first vertical rotational axis $q_1$. A hinge moment sensor of said axis determines the torque $M_1$ acting on it. A robotic arm 1.2 is pivotably supported or coupled around a second horizontal rotational axis $q_2$ at the basic frame. A hinge moment sensor of said axis determines the torque $M_2$ acting on it. A tool 1.3 is mounted on a flange tool of the robotic arm. A sensor for measuring the force moment determines a force $F_1$, $F_2$ on six axes between the flange tool and the tool.

In a squeeze-related situation illustrated in FIG. 1A, the robot has squeezed an obstacle on the floor with its tool as illustrated by a compressed spring 2. In contrast, in a squeeze-related situation illustrated in FIG. 1B, the robot has squeezed an obstacle against a vertical wall with its tool, as illustrated by a compressed spring 2'.

In the example, the obstacle, related the squeezing and/or actively, for example as a result of it leaning against the tool, is exerting a force onto the robot-guided tool, which is determined as $F_1$ or $F_2$ between the flange tool and the tool and induces corresponding torques $M_1$ and $M_2$. In the example, as a consequence of the force exerted by the obstacle, the torque induced in the axes $q_1$ and $q_2$ exceeds the corresponding torque as a consequence of the weight (which equals zero in axis $q_1$, since this axis is not subject to gravitational force).

In the following explanation, the torques $M_1$, $M_2$ determined by the hinge moment sensors of the axes $q_1$, $q_2$ are used as axial loads $T_1$, $T_2$ as an example; in a different embodiment, it is also possible to use the forces $F_1$, $F_2$ instead.

Figure 2:
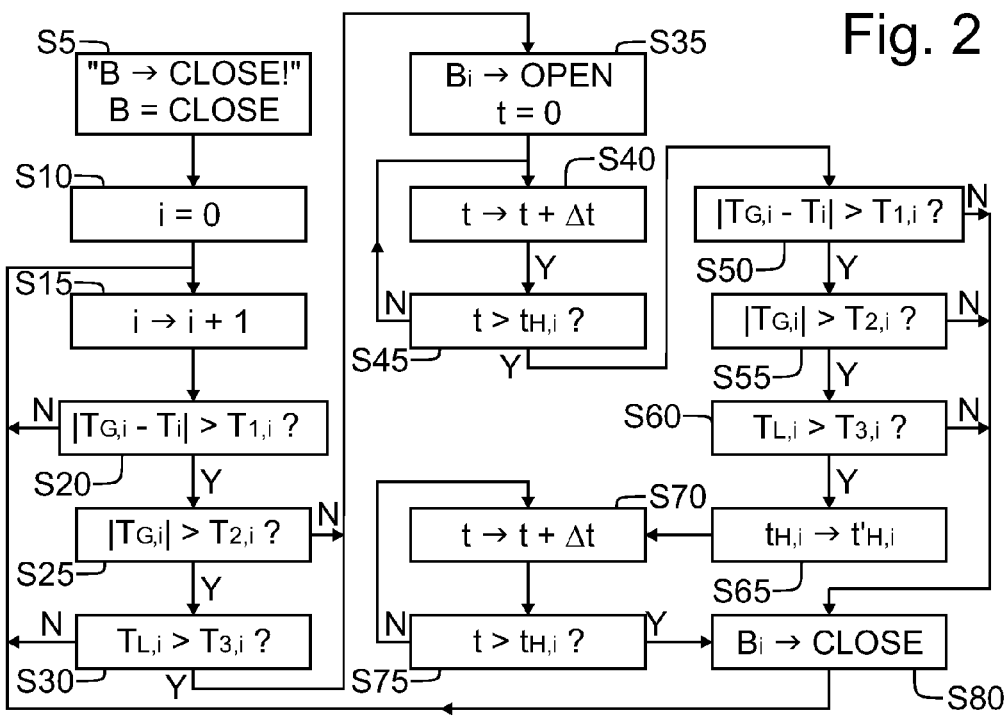
FIG. 2 shows the sequence of a procedure for controlling the robot of FIG. 1 according to one embodiment of the present invention.

FIG. 2 is initially used to explain the sequence of a procedure for controlling the robot according to a more complex embodiment of the present invention, in which the two aspects of a specified duration and a dependency of an axial load explained above are combined with each other. As explained afterwards, both aspects can also be realized independently from each other.

In a step S5, the drive mechanisms of the axes $q_1$, $q_2$ are disconnected from an energy supply related to the monitoring or specifications, and a command for the closure of the holding brakes of the axes $q_1$, $q_2$ of the robot is issued, preferably if the robot is shut down (shown in FIG. 2 with the command "B→CLOSE!") or the holding brakes are closed related to the monitoring or specifications (shown in FIG. 2 with the status B=CLOSE).

Then, by initializing or incrementing a counter in steps S10, S15, a step S20 is initially used for both axes to check whether a deviation of the respective axial load $T_i$ from an axis-dependent load specification $T_{G,i}$ exceeds a limit value $T_{1,i}$ with regard to the amount. In so doing, the limit value $T_{1,i}$ is adjustable, the load specification $T_{G,i}$ is a gravitational force-related axial load, which coincides with the moment induced by the robot's own weight in the respective axis and can be determined based on the model. It becomes evident that the load specification $T_{G,2}$ is pose-dependent, that it is at a maximum in particular in the horizontal pose illustrated in FIG. 1 and at a minimum in a vertically stretched upward or downward suspended pose, while the load specification $T_{G,1}$ disappears.

In the event that the deviation does not exceed the limit value (S20: "N"), the corresponding holding brake remains unaffected, in particular a command is issued for its closure or it remains closed.

In contrast, in the event that the deviation exceeds the limit value (S20: "Y"), a step S25 is used to check whether this concerns an actually gravitational force-loaded axis, by verifying whether the gravitational force-related load specification $T_{G,i}$ exceeds a tolerance-related limit value $T_{2,i}$ in terms of the amount.

In the event that this concerns an actually gravitational force-loaded axis or the gravitational force-related load specification exceeds the limit value $T_{2,i}$ (S25: "Y"), a step S30 is used to check further whether the corresponding axial load is acting in a pose-dependent, gravitational force-related load direction. For this purpose, the axial load $T_i$ is transformed with the correct signs into a lifting torque $T_{L,i}$ that reacts to the effect of the gravitational force: as long as the robotic arm is located in the two right quadrants of FIG. 1A, in particular in the illustrated vertically stretched out position toward the right between said two right quadrants, an axial moment $T_i$ acting in a counterclockwise direction in FIG. 1 is determined as positive lifting torque $T_{L,i}$ of >0, while an axial moment $T_i$ acting in clockwise direction is determined as negative lifting torque $T_{L,i}$ of <0. However, as long as the robotic arm is located in the two left quadrants of FIG. 1A, in particular in a vertically stretched position to the left that mirrors the illustrated position between said two left quadrants, an axial moment $T_i$ acting in a counterclockwise direction is determined as negative lifting torque $T_{L,i}$ of <0, while an axial moment $T_i$ acting in a clockwise direction is determined as positive lifting torque $T_{L,i}$ of >0.

In step S30, it is verified analogously whether said lifting torque $T_{L,i}$ exceeds a limit value $T_{3,i}$ or not. If the lifting torque $T_{L,i}$ exceeds the limit value $T_{3,i}$ (S30: "Y"), i.e., if the axial load is acting as an adequate lifting torque reacting to the effect of the gravitational force, then the procedure continues with step S35; otherwise (S30: "N"), the corresponding holding brake remains unaffected, in particular a command is issued for its closure or it remains closed.

If this does not concern an actually gravitational force-loaded axis, or if the gravitational force-related specification does not exceed the limit value $T_{2,i}$ in terms of the amount (S25: "N"), then this check is skipped according to step S30 and the procedure continues directly with step S35.

In this fashion, the sign of the lifting torque is used to determine whether the respective axial load is acting in the gravitational force-related load direction to lift the robotic arm (S30: "Y") or not (30: "N").

If with an actually gravitational force-loaded axis (S25: "Y"), the axial load is acting in the specific, pose-dependent load direction to lift the robotic arm (S30: "Y"), or if this does not concern an actually gravitational force-loaded axis (S25: "N"), the procedure continues with step S35; otherwise, the corresponding holding brake remains unaffected, in particular, a command is issued for its closure or it remains closed.

In step S35, the corresponding holding brake is opened or a command is issued for the holding brakes to remain open, jointly illustrated in FIG. 2 with $B_i \rightarrow OPEN$. In addition, a time counter t is initialized (t=0).

It is incremented (step S40, step S45: "N") until a specified, axis-dependent first period of time $t_{H,i}$ has elapsed (S45: "Y").

Now steps S50 to S60 and steps S20 to S30 are used to check in a corresponding fashion, whether the deviation is still exceeding the limit value (S50: "Y"), whether this concerns an actually gravitational force-loaded axis (S55: "Y") and whether the axial load is then acting in the specific, pose-dependent load direction to lift the robotic arm (S60: "Y"). Only if these conditions are met (S50: "Y" and S55: "Y" and S60: "Y"), does the procedure continue with step S65; otherwise (S50: "N" or S55: "N" or S60: "N") with step S80. In this step, S80, the corresponding holding brake is closed ($B_i \rightarrow CLOSE$).

In step S65, the specified period of time $t_{H,i}$ is extended once to $t'_{H,i}$ and the time counter t is incremented further (step S70, step S55: "N"), until said extended period of time $t_{H,i}$ has also elapsed (S75: "Y"). Next, the corresponding holding brake is likewise closed in step S80 ($B_i \rightarrow CLOSE$).

It becomes apparent that the holding brakes are in each case opened again for a specified axis-dependent duration $t_{H,i}$ or remain open prior to the closure (S35) with this procedure, if the deviation of the axial load from an axis-dependent, pose-dependent, gravitational force-related load specification exceeds a limit value (S20: "Y") and in the case of a gravitational force-loaded axis (S25: "Y") is additionally acting in a pose-dependent, gravitational force-related load direction (S30: "Y"). Said first specified duration $t_{H,i}$ is extended (S65), if after it has ended (S45: "Y") the deviation still exceeds a limit value (S50: "Y") and in the case of a gravitational force-loaded axis (S55: "Y") is additionally acting in a pose-dependent, gravitational force-related load direction (S60: "Y"). As a result, the holding brake is in each case opened again for a specified duration, depending on an axial load or remains open prior to the closure related to the monitoring.

As explained at the beginning, this represents a complex variant, in which a plurality of aspects of the present invention are combined multiple times, in particular the selection of the squeezing axes or the extension of the specified duration depending on the axial load (S20, S30, S50, S60) with the renewed opening or the continued opening for a specified duration (S40, S45, S70, S75). FIG. 2 provides a compact illustration of different simpler variants:

For example, all steps except S5-S15, S35-S45 and S80 are omitted in one variant. Then, the holding brakes for all axes are simply opened again for a specified duration or remain open in spite of the monitoring-related closure command.

In an upgrade of this variant, the steps S20 and/or S25, S30 are added. Then, only holding brakes of squeezing axes are or remain open (S20: "Y") or holding brakes are or remain only open (S30: "Y") in the event that a squeezing force prevents the slumping of the robot, meaning that the respective axial load is acting in a specific, pose-dependent direction in such a way that a gravitational force-related slumping is prevented.

In a further upgrade of said variant, the steps S50 and/or S55, S60 as well as S65 to S75 are added. Then, the specified duration is extended depending on the axial load.

In another variant, the steps S40, S45, S65 to S75 are omitted, whereby the procedure instead returns to step S50, if the condition in step S60 is answered with yes. Then, the holding brakes are opened again or still remain open in spite of the issued monitoring-related closure command, for as long as the respective axis is squeezing the obstacle (S20, S50: "Y") or the holding brakes are or remain open for as long as a squeezing force prevents the slumping of the robot (S30, S60: "Y").

In an upgrade of said variant, the steps S40, S45 or S70, S75 are added to implement a temporal hysteresis.

In all of the variants mentioned above, instead of the combination of the steps S20 and S25, S30 and/or the steps S50 and S55, S60, it is in each case possible to only take into consideration or check the transgression of the limit value (S20, S50), or for gravitational force-loaded axes (S25, S55: "Y") only the load direction (S30, S60).

REFERENCE LIST 1.1 Robot base
1.2 Robotic arm
1.3 Robotic tool
2; 2' Obstacle
3 Control means

What is claimed is:

1. A method for controlling a robot having a controller and a plurality of articulation axes, with at least one axis that includes a drive mechanism for moving the axis and a holding brake for limiting movement of the axis, the method comprising the controller performing:
closing the holding brake; and
at least one of:
opening the holding brake after the closing step based on an axial load and/or opening the holding brake for a specified duration, or
delaying the closure of the holding brake for a period of time.

2. The method of claim 1, wherein the holding brake is closed in response to detecting a collision by a monitoring means.

3. The method of claim 1, wherein:
the holding brake is opened after the closing step if the axial load or a deviation of the axial load from a specified load exceeds a specified limit value and/or the axial load is acting in a specified load direction.

4. The method of claim 3, wherein the holding brake is opened after the closing step for a specified duration, or the closure of the holding brake is delayed.

5. The method of claim 3, wherein the specified load is at least one of an adjustable or axis-dependent and/or pose-dependent load specification.

6. The method of claim 5, wherein the specified load is a gravitational force-related load specification.

7. The method of claim 3, wherein the specified limit value is at least one of an adjustable or axis-dependent and/or pose-dependent limit value.

8. The method of claim 7, wherein the specified limit value is a gravitational force-related limit value.

9. The method of claim 3, wherein the holding brake is opened after the closing step if the axial load is acting in a pose-dependent and/or gravitational force-related load direction.

10. The method of claim 1, wherein the duration for which the holding brake is opened is specified depending on the axis.

11. The method of claim 1, wherein the duration for which the holding brake is opened does not exceed 2 seconds.

12. The method of claim 1, wherein the duration for which the holding brake is opened is specified depending on a pose of the robot and/or in such a way that a gravitational force-related motion of the axis is limited.

13. The method of claim 1, wherein the duration for which the holding brake is opened is specified in advance or depending on the axial load of the robot.

14. The method of claim 13, wherein the duration for which the holding brake is opened is extended if, after a first specified duration, the axial load or a deviation of the axial load from a specified load specification exceeds a specified limit value and/or the axial load is acting in a specified load direction.

15. The method of claim 14, wherein the specified load is at least one of an adjustable or axis-dependent and/or pose-dependent load specification.

16. The method of claim 15, wherein the specified load is a gravitational force-related load specification.

17. The method of claim 14, wherein the specified limit value is at least one of an adjustable or axis-dependent and/or pose-dependent limit value.

18. The method of claim 17, wherein the specified limit value is a gravitational force-related limit value.

19. The method of claim 14, wherein the duration for which the holding brake is opened is extended if the axial load is acting in a pose-dependent and/or gravitational force-related load direction.

20. The method of claim 14, wherein the duration is specified shorter for at least one potentially gravitational force-loaded axis than for at least one axis that is not gravitational force-loaded.

21. The method of claim 20, wherein at least one of the first specified duration or the extended duration is specified shorter for the at least one at least potentially gravitational force-loaded axis than for the at least one axis that is not gravitational force-loaded.

22. The method of claim 1, wherein the holding brake is opened again or the closure of the holding brake is delayed while the drive mechanism of the axis is inactive in response to detecting a collision by a monitoring means.

23. The method of claim 22, wherein the holding brake is opened again or the closure of the holding brake is delayed while the drive mechanism of the axis is disconnected from an energy supply and/or the robot is at least essentially shut down.

24. Controller for controlling a robot having a plurality of articulation axes, with at least one axis that includes a drive mechanism for moving the axis and a holding brake for limiting movement of the axis, at least one sensor monitoring the robot, and an actuator that opens and/or closes the holding brake, wherein the controller carries out the method of claim 1.

25. A robot arrangement, comprising:
a robot, in particular an articulated arm robot having a plurality of articulation axes, with at least one axis having a drive mechanism and a holding brake; and a controller that controls the robot, the controller including program code stored on a non-transitory storage medium that, when executed by the controller, causes the controller to:
close the holding brake, and
at least one of:
open the holding brake after the closing step based on an axial load and/or opening the holding brake for a specified duration, or
delay the closure of the holding brake for a period of time;
wherein the holding brake is opened after the closing step if the axial load or a deviation of the axial load from a specified load exceeds a specified limit value and/or the axial load is acting in a specified load direction; and
wherein the holding brake is opened after the closing step if the axial load is acting in a pose-dependent and/or gravitational force-related load direction.

26. The robot arrangement of claim 25, wherein the robot has at least six axes, each axis having a drive mechanism and a holding brake.

27. A computer program product, comprising:
    a non-transitory computer-readable medium;
    program code stored on the non-transitory computer-readable medium and configured to control a robot having a plurality of articulation axes with at least one axis that includes a drive mechanism for moving the axis and a holding brake for limiting movement of the axis, the program code directing a robot controller to:
    close the holding brake; and
    at least one of:
        open the holding brake after the closing step based on an axial load and/or opening the holding brake for a specified duration, or
        delay the closure of the holding brake for a period of time.

\* \* \* \* \*